Figure 4:
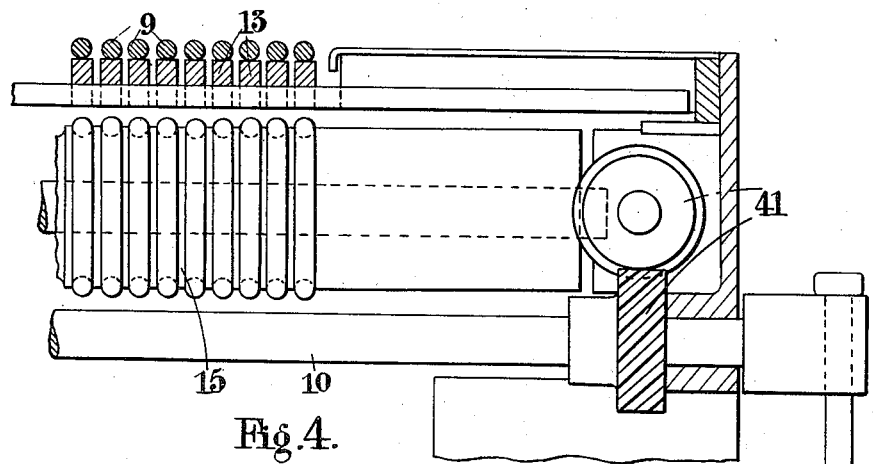

Nov. 19, 1940.  J. C. PATERSON  2,221,845
FEEDING OR CONVEYING BISCUITS OR OTHER ARTICLES
Filed Nov. 29, 1938    3 Sheets-Sheet 1
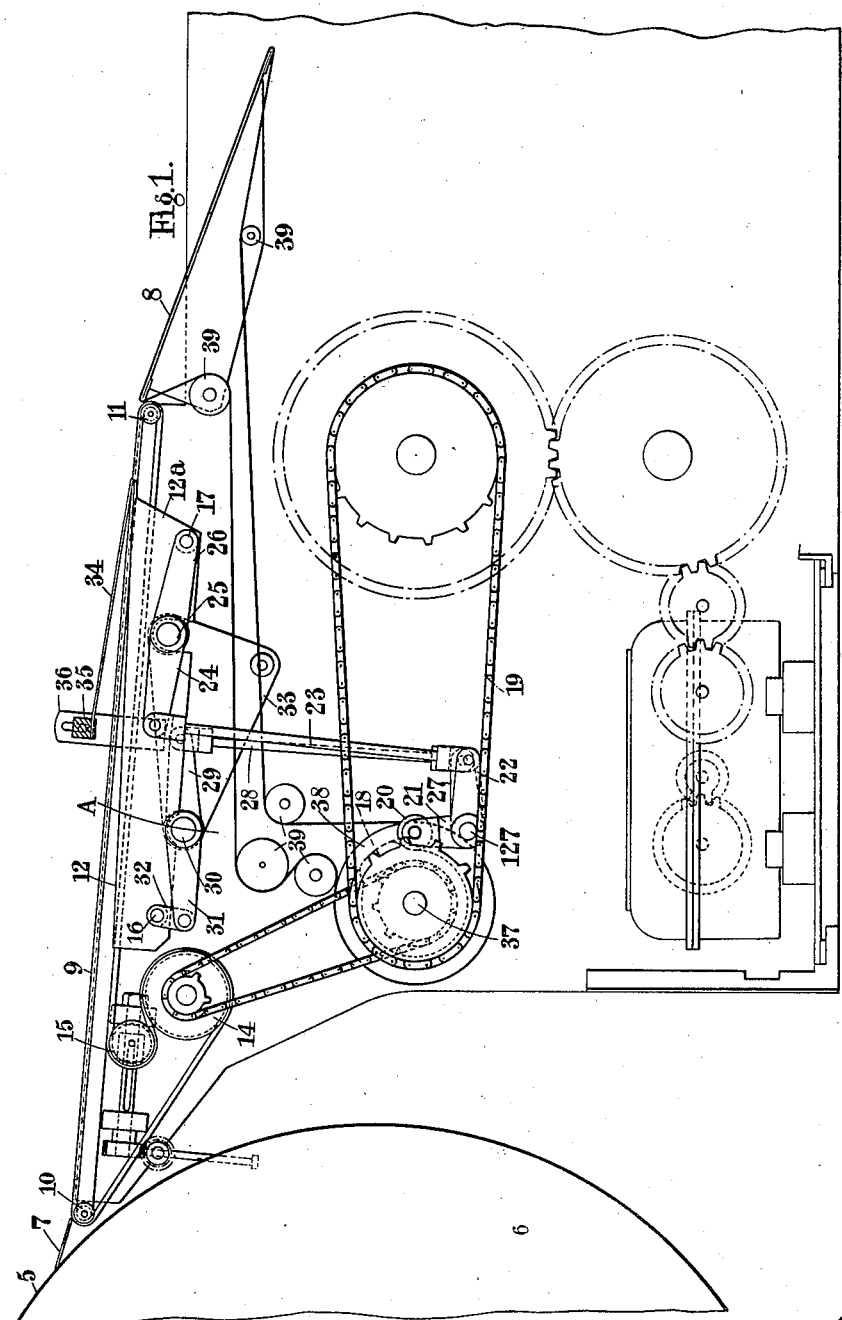
J. C. Paterson
Inventor
By George B. Willey
Atty.

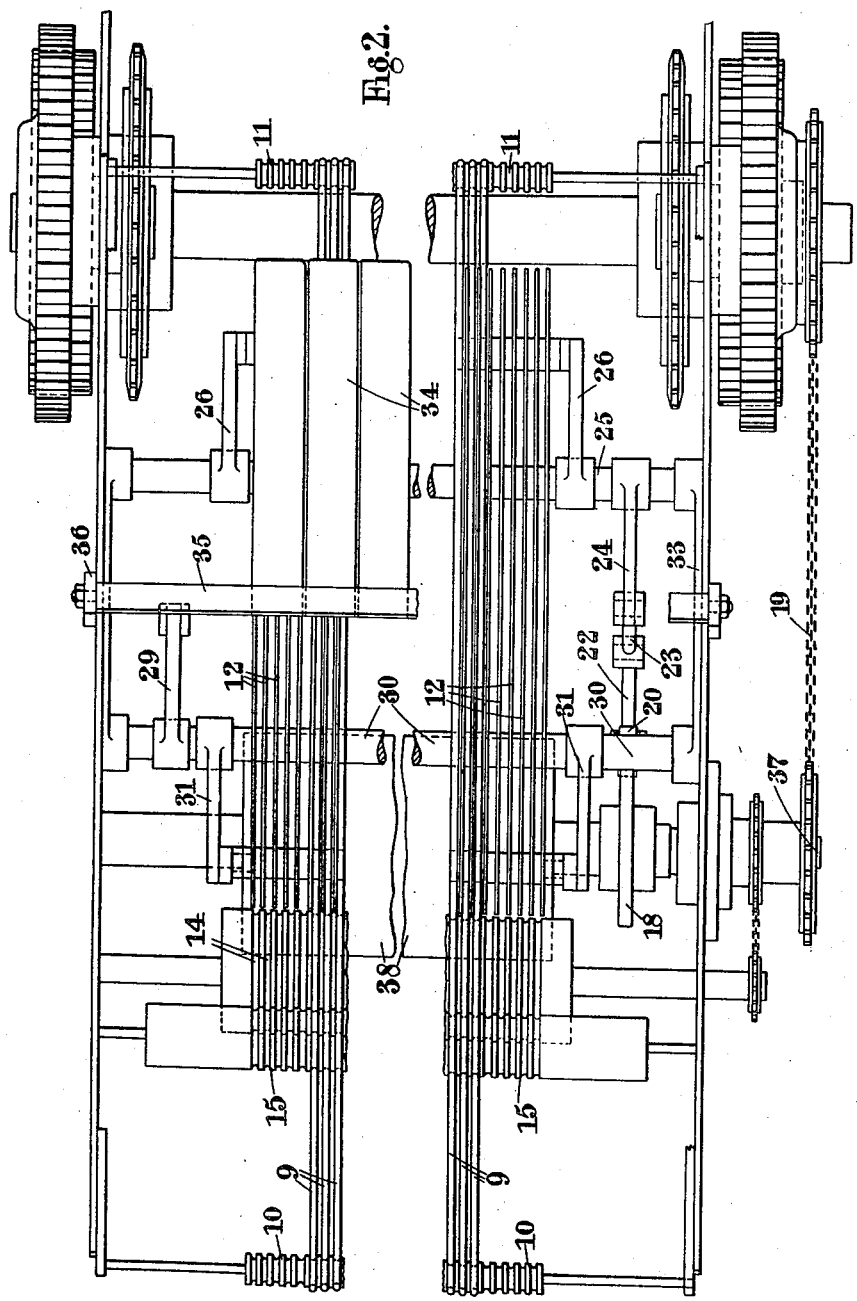

Patented Nov. 19, 1940

2,221,845

UNITED STATES PATENT OFFICE 2,221,845

FEEDING OR CONVEYING BISCUITS OR OTHER ARTICLES

John Currie Paterson, Peterborough, England, assignor to Baker Perkins Company, Inc., Saginaw, Mich.

Application November 29, 1938, Serial No. 242,995
In Great Britain December 10, 1937

7 Claims. (Cl. 107—7)

This invention relates to means for feeding or conveying biscuits or other articles in rows and has for its object the delivery of biscuits or other articles in batches to travelling pans or trays from a continuous supply. For convenience the invention will be hereinafter described in its application to biscuits.

It will be appreciated that where biscuits are discharged from a band oven in a continuous file or column of rows and where it is desired to deliver the biscuits to a series of travelling pans, it is necessary to split the file or column of rows of biscuits into separate batches and to place these batches in succession on the pans taking into account the spacing interval between the pans. An aim of the invention is to deal with this problem and provide means adapted to deliver batches of biscuits from a band oven or like supply to a series of pans carried by a travelling conveyor for cooling or other purposes.

The invention consists broadly of means temporarily arresting the travel of a predetermined number of biscuits or rows of biscuits on a conveying surface for intervals of time successively less for each biscuit or row from the first to the last of the group while said surface traverses a short distance beneath the stationary biscuits so that the spacing between the rows of biscuits acted upon is diminished and the column of rows split into batches.

The invention further provides means for separating the leading rows of a continuous column of rows of biscuits to form batches and depositing them row by row over a fixed knife edge on to the pans of a travelling pan conveyor, the arrangement being such that the interval between the batches conforms to the interval between the pans on the conveyor.

More specifically the invention consists of improved apparatus for forming batches of biscuits from a travelling column of rows of biscuits for delivery to pan conveyor, comprising a conveying surface formed of a plurality of spaced linear elements parallel to the direction of feed, biscuit raising means located between the linear elements and presenting a lifting surface inclined upwardly in the direction of feed of the conveying surface, and means operable at predetermined intervals to raise the lifting surface above the conveying surface to lift rows of biscuits in succession from the conveying surface and to restore them thereto.

In the accompanying drawings which illustrate a biscuit batching and delivery machine according to the invention—

Figure 3:
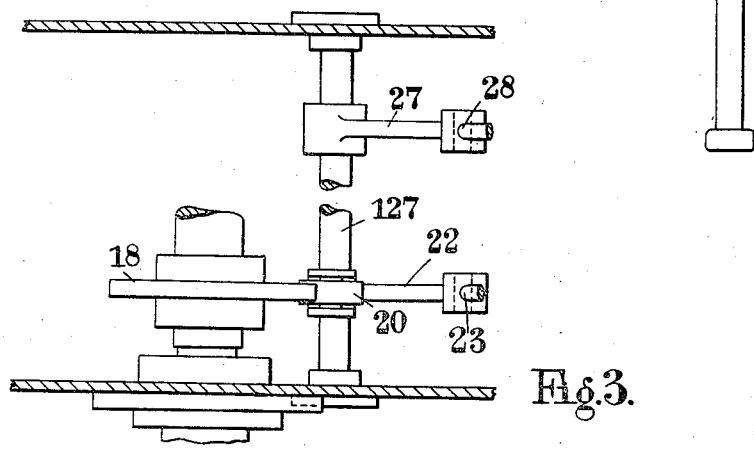

Figure 1 is an elevation,
Figure 2 is a plan having certain parts broken away or removed for clearness,
Figure 3 is a partial sectional plan, and
Figure 4 is a partial sectional elevation.

In carrying the invention into effect according to one convenient mode described by way of example as applied to a steel band biscuit oven, the discharge end of the oven at the point where the steel band 5 begins to turn around its terminal roller 6 is provided with a knife or bridge piece 7 contacting with or adjacent to the band so that the biscuits are stripped from the band or slide off the band as they come to the end of the travel on the steel band and arrive at the knife or bridge piece. This bridge piece delivers the biscuits to a batch forming conveying device indicated generally by the reference A which is sloped slightly downwardly towards the path of a pan conveyor (not shown). Between this batch forming conveying device A and the pan charging station an endless delivery conveyor or transfer 8 of the band or apron type is provided and is adapted to discharge the batches of biscuits which are divided from the column on the steel oven band 5 on to the pans as they pass under its end.

The dividing or batch forming conveying means A comprise a series of laterally spaced endless linear elements 9 such as cords, chains or tightly coiled springs supported on terminal guide rollers 10, 11. The spacing interval between these linear elements 9 is sufficient to admit the introduction of slats or thin bar members 12 of a suitable length relatively to the upper run of the conveying cords, chains or springs 9 (hereinafter referred to as "endless coils"). The endless coils 9 are preferably supported upon guides 13, which may be grooved, and pass over a grooved driving roller 14 and a tensioning roller 15. The return laps of the endless coils may be spaced from the upper lap a sufficient distance to admit of the slats above mentioned, together with means for operating them, being accommodated, or they may be arranged closely thereto as shown.

The slat members 12 are mounted upon spindles 16 and 17 and are arranged so that their upper edges lie in a plane which is inclined to the plane of the upper lap of the endless coils 9, the sense of the inclination being such that when the slats are raised the lower end 12a (or end farthest away from the oven) of the slats is the first to rise and protrude between the coils 9. As the upward motion is continued the upper edge of the slats is progressively exposed.

Means are provided preferably controlled or operated by timing cam whereby the slats are periodically raised and lowered with respect to the plane of the upper lap of the endless coils 9.

Thus a rotary cam 18 is driven by a chain 19 from the terminal roll (not shown) of the pan conveyor. The cam 18 is engaged by a roller 20 carried by the arm 21 of a bell crank lever, the other arm 22 of the bell crank lever being coupled by a link 23 to a lever 24 fixed upon a rock shaft 25. This rock shaft carries a pair of levers 26 which are connected to the spindle 17. The shaft 127 upon which the bell crank lever 21, 22 is mounted extends across the machine and at the side carries a lever 27 which is coupled by a link 28 to a lever 29 fixed upon a second rock shaft 30. This rock shaft carries a pair of levers 31 which are connected by links 32 to the spindle 16. The rock shafts 25 and 30 are supported inside brackets 33.

The arrangement is such that as the cam 18 engages the roll 20 the shaft 127 is rocked to move the links 23 and 28 downwardly. This movement causes a rocking of the rock shafts 25 and 30 in opposite directions with a consequential upward movement of the levers 26 and 31 and the slats 12.

In operation it will be appreciated that as the rows of biscuits are being conveyed by the endless coils 9, they will periodically be raised by the slats 12 in succession commencing with that row which is farthest along the conveyor. The raising of the biscuits lifts them out of contact with the coils so that in succession they cease for a few moments to be driven or moved forward by said coils with the result that the interval between a lifted row and that next following will be diminished. As the slats are lowered the rows of biscuits are replaced in succession upon the endless coils.

It will also be noted that as the biscuits are restored, upon the progressive descent of the supporting edges of the slats 12, there will be a further closing up of the interval between rows similar to that which took place while they were being raised.

The period of operation and the inclination of the slats and the rate of the raising and lowering are calculated so that the rows of biscuits in the column will be closed up to an extent sufficient to break the column in succession into a plurality of batches and so that the spacing between the rows of biscuits is diminished sufficiently to afford an interval between batches slightly greater than between the pans on the pan conveyor.

The batches of biscuits are transferred to the second or delivering conveyor 8 and each batch is discharged to the pans as they travel beneath the end of the conveyor 8.

It will be appreciated that on the rising movement of the slats 12 a row of biscuits may be so placed that they overhang the forward end of the slats 12 and there is thus a possibility of the elevation of their tails by the forward ends of the slats, and in order to prevent this occurring light spring tongues 34 are mounted above the conveying coils 9 and act to press the foremost row on to the slats 12 and prevent their becoming dislodged.

The spring tongues 34 are mounted upon a bar 35 which is pivotally mounted inside brackets 36, screw means being provided whereby the angular position of the bar 35 may be varied to adjust the tension of the spring tongues. The driving roller or drum 14 of the batching conveyor A is conveniently driven from the cam shaft 37. This shaft also carries a driving roller or drum 38 for the intermediate or delivery conveyor apron 8 which passes over guide rolls 39.

The tension roll 15 for the coils 9 is mounted in sliding bearings operated at either end by a shaft 40 and gearing 41.

The pan conveyor may be of well-known chain type and arranged to follow any path required for cooling or other purposes but in each case the end of the conveyor towards the oven is arranged so that the pans after passing upwardly from the return lap around terminal chain wheels travel in a horizontal path beneath it and as the pans pass forwardly they each receive a batch of biscuits deposited row by row from the end of the delivery conveyor 8. As the division of the column into batches synchronises with and is adjusted to the interval between the pans, each batch of biscuits will be placed properly in position on a pan as it travels along and emerges from under the end of the delivery conveyor.

While it is preferred to provide a separate delivery conveyor 8, which admits of a vertical adjustment of the delivery end to suit the pan conveyor, the batch forming conveyor A may be extended a batch length or more beyond the part through which the slats 12 operate and thus discharge the batches of biscuits directly on to the pans.

I claim:

1. Apparatus for forming batches of biscuits from a travelling column of transverse rows of biscuits for delivery to a pan conveyor, comprising a conveying device formed of a plurality of spaced linear elements parallel to the direction of feed, biscuit raising means located between the linear elements and having a surface inclined upwardly in the direction of feed of the conveying device, and means for intermittently raising and lowering the biscuit raising means to move said inclined surface above said conveying device to raise transverse rows of biscuits in succession from the conveying device and restore them thereto.

2. Apparatus as claimed in claim 1 wherein the conveying device comprises spaced endless ropes and the biscuit raising means comprise vertically reciprocable slats located in the spaces between the endless ropes, the upper edges of the slats being inclined upwardly in the direction of feed of said endless ropes.

3. Apparatus as claimed in claim 1 wherein the conveying device comprises spaced endless ropes and the biscuit raising means comprise vertically reciprocable slats located in the spaces between the endless ropes, the upper edges of the slats being inclined upwardly in the direction of feed of said endless ropes, and wherein spring tongues are provided above the high end of the slats and press thereon to hold biscuits which extend over the edges of the slats when the slats are in the raised position.

4. Apparatus as claimed in claim 1 wherein the conveying device comprises spaced endless ropes and the biscuit raising means comprise vertically reciprocable slats located in the spaces between the endless ropes, the upper edges of the slats being inclined upwardly in the direction of feed of said endless ropes, levers supporting said slats, a pair of rock shafts to which the levers are secured, and a rotary cam synchronised with the pan conveyor and operatively connected to said rock shafts.

5. Apparatus comprising a conveyor for conveying biscuits in a continuous column of rows and means for temporarily raising a desired number of rows of biscuits at the head of the column from the conveyor surface in succession so that said surface travels a short distance between the liftings of successive rows, then lowering the raised rows onto the conveying surface, whereby the intervals between the rows of biscuits acted upon are diminished and the column of rows is divided into spaced batches each comprising said desired number of rows.

6. Apparatus for grouping biscuits or like articles into spaced batches of predetermined size comprising a continuously traveling conveyor for conveying one or more columns of evenly spaced biscuits and means for temporarily removing the biscuits of each batch from said conveyor and arresting their travel for intervals of time successively less for each biscuit from the first or leading biscuit of said batch to the last, whereby the intervals between the biscuits in each batch are diminished and the spacing between consecutive batches is increased.

7. Apparatus for grouping biscuits or like articles into spaced batches of predetermined size comprising a continuously traveling conveyor for conveying one or more columns of evenly spaced biscuits and means for temporarily arresting the travel of the biscuits of each batch on said conveyor for intervals of time successively less for each biscuit from the first or leading biscuit of said batch to the last, whereby the intervals between the biscuits in each batch are diminished and the spacing between consecutive batches is increased.

JOHN CURRIE PATERSON.